United States Patent [19]
Kondo

[11] 3,995,292
[45] Nov. 30, 1976

[54] MOTOR DRIVEN CAMERA
[75] Inventor: Toshihiro Kondo, Chofu, Japan
[73] Assignees: Toshihiro Kondo and Fuji Photo Film Co., Ltd., both of Japan
[22] Filed: Nov. 12, 1975
[21] Appl. No.: 631,212

[30] Foreign Application Priority Data
Nov. 14, 1974 Japan.............................. 49-132479

[52] U.S. Cl.............................. 354/173; 354/204; 354/213
[51] Int. Cl.² .................... G03B 19/04; G03B 17/42
[58] Field of Search ........... 354/173, 171, 170, 206, 354/204, 213, 212

[56] References Cited
UNITED STATES PATENTS

| | | | |
|---|---|---|---|
| 3,064,522 | 11/1962 | Fukuoka | 354/204 X |
| 3,598,034 | 8/1971 | Suzuki | 354/213 |
| 3,705,338 | 12/1972 | Tsujimoto | 354/204 X |

Primary Examiner—Joseph W. Hartary

[57] ABSTRACT

In a motor driven camera including a motor which starts upon the first stage of depression of a shutter release button, a clutch mechanism is provided between the motor and a film wind-up member. A shutter releasing circuit is provided which includes a first switch which is closed upon the second stage of depression of the shutter release button, a second switch which is opened upon the completion of shutter release and a third switch which is opened in response to the start of operation of the film wind-up member. A change-over lever changes over the clutch mechanism from a condition in which the rotation of the motor is transmitted to the driving wheel connected with the film wind-up member to a condition in which the rotation of the motor is not transmitted to the drive wheel. When the film wind-up member is returned to its start position after completing the film wind-up operation, the change-over lever is operated to change over the clutch mechanism from the transmission state to the non-transmission state.

7 Claims, 3 Drawing Figures

MOTOR DRIVEN CAMERA

BACKGROUND OF THE INVENTION

This invention relates to a motor driven camera, and more particularly to a photographic camera in which the film is automatically wound up by a motor which is driven by a signal from a shutter release means indicating that the shutter release is completed.

Various types of motor driven cameras have been known in the art for automatically winding up the film continuously just by keeping on depressing a shutter release button. In this kind of cameras, it is desirable that the mechanism for winding up the film driven by a motor be as simple as possible and can be manufactured at low cost. Further, it is desirable that the transmission of power of the motor to the film wind up mechanism be reliable.

SUMMARY OF THE INVENTION

The primary object of the present invention is to provide a motor driven camera of simple construction.

Another object of the present invention is to provide a motor driven camera which can be manufactured at low cost.

Still another object of the present invention is to provide a motor driven camera in which the power of the motor is effectively transmitted to the film wind-up mechanism.

A further object of the present invention is to provide a motor driven camera in which a planetary gear mechanism is used as a clutch for transmitting the power of a motor to a film wind-up mechanism smoothly and effectively.

The motor driven camera in accordance with the present invention comprises (a) a motor which starts upon the first stage of depression of a shutter release button, (b) a clutch mechanism including a driving wheel, a free wheel and a braking means which selectively stops one of the two wheels, the driving wheel and a film wind-up member connected with the driving wheel being driven by the motor when the free wheel is stopped by the braking means, (c) a film wind-up member mounted on the driving wheel by way of a ratchet wheel so that the film wind-up member may be related together with the driving wheel when the member is engaged with the ratchet wheel by means of a hook, the film wind-up member being rotated independently of the ratchet wheel when the engaging hook is separated from the ratchet wheel, (d) a shutter blade driving circuit including a first switch which is closed upon the second stage of depression of the shutter release button, a second switch which is opened by the signal indicating the completion of shutter release and a third switch which is opened in response to the start of operation of the film wind-up member, and (e) a change-over lever which changes over the braking means of the clutch mechanism from the driving wheel to the free wheel to stop the free wheel and make the hook engaged with the ratchet wheel to have the film wind-up member move together with the driving wheel.

In operation of the above summarized motor driven camera in accordance with the present invention, the motor is started to rotate upon the first stage of depression of the shutter release button. At this time, the clutch mechanism is in the state wherein the driving wheel is stopped and the free wheel is rotated by the motor. When a time required for the rise of the speed of revolution of the motor up to a predetermined value has lapsed, the first switch is closed upon the second stage of depression of the shutter release button. Since the second and the third switches are closed at this moment, the shutter blade driving circuit is operated to release the shutter. Upon the completion of the shutter release, a shutter release completion signal is generated to operate the change-over switch and open the second switch to stop the operation of the shutter blade driving circuit. Further, simultaneously therewith, the braking means of the clutch mechanism is operated to release the driving wheel and stop the free wheel and to make the hook engaged with the ratchet wheel for moving the film wind-up member together with the driving wheel. Therefore, the rotation of the motor is transmitted to the driving wheel and the driving wheel starts to rotate and the third switch in the shutter blade driving circuit is opened. The film wind-up member is also rotated to wind up the film charging a spring.

By the 180° rotation of the film wind-up member, one frame of the film is wound up and the braking means is switched from the free wheel to the driving wheel and the hook is disengaged from the ratchet wheel. Thus, the driving wheel is stopped of its rotation and the film wind-up member is released from the driving wheel and returned to its original position by the force of the charged spring, and the third switch is closed again to set the whole mechanism in the ready condition. In response to the switching operation of the braking means made by the completion of the film wind-up operation, the change-over lever is also returned to its original position and the second switch is closed.

DESCRIPTION OF THE PREFERRED EMBODIMENT

Figure 1:
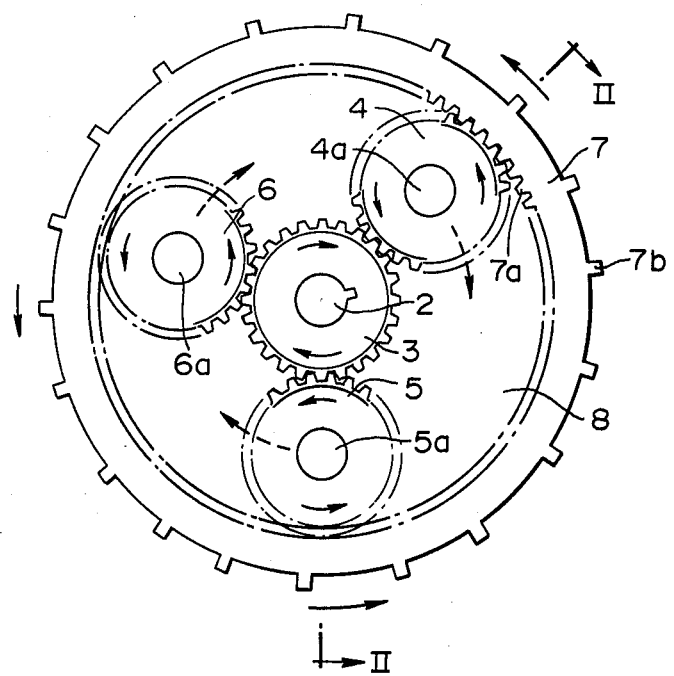
FIG. 1 is a bottom view showing a planetary gear mechanism employed in the clutch mechanism used in the motor driven camera in accordance with the present invention.
Figure 2:
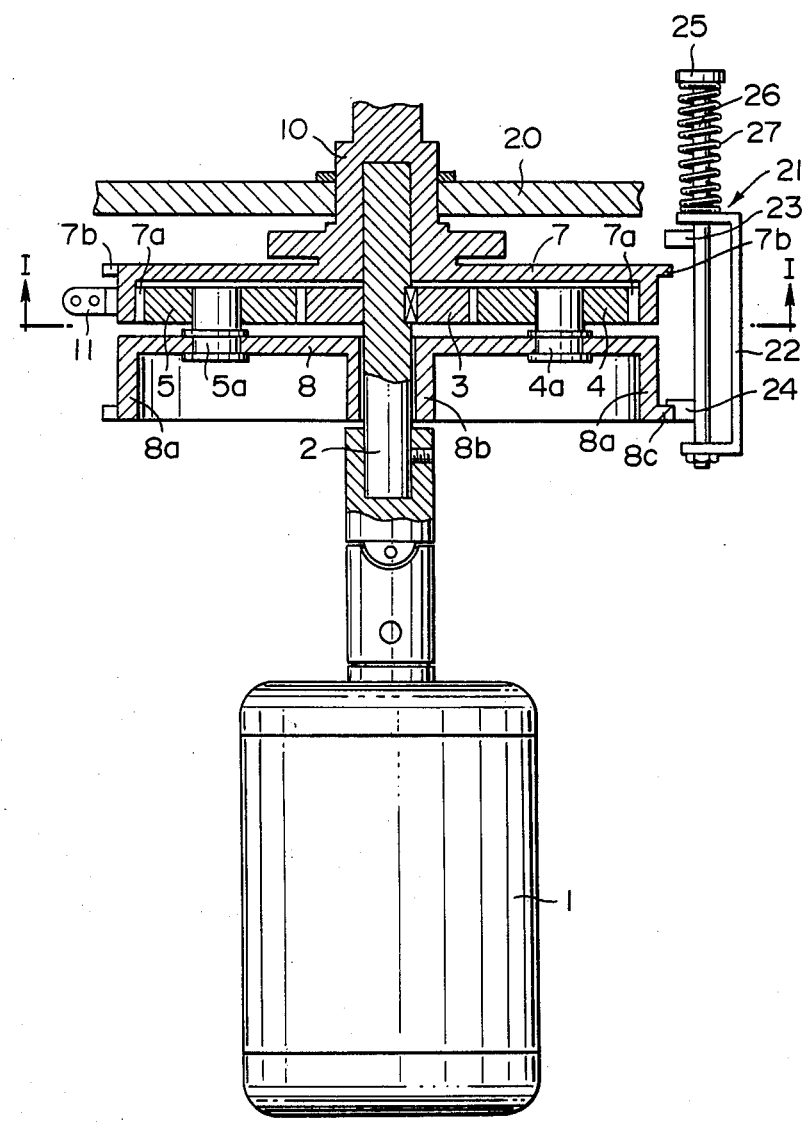
FIG. 2 is a vertical section view showing the clutch mechanism employed in the present invention.

Referring to FIG. 1 which shows an example of a clutch mechanism employed in the present invention, a drive gear 3 is fixed to a rotatable shaft 2 of a motor 1 (FIG. 2). Three planetary gears 4, 5 and 6 of the same diameter having the same number of teeth are provided around the drive gear 3 in meshing engagement therewith. The planetary gears 4, 5, and 6 are also meshed with an internal gear 7a of a drive wheel 7 which encloses the three planetary gears 4, 5 and 6. The three planetary gears 4, 5 and 6 are rotatably mounted on shafts 4a, 5a and 6a which are located on a circle concentric with the drive gear 3 and fixed to a free wheel 8 which is rotatable about the shaft 2 of the motor 1. The free wheel 8 is made to rotate independently of the motor 1.

In the above described clutch mechanism, when the free wheel 8 is fixed and the drive gear 3 is rotated clockwise by the motor 1, the planetary gears 4, 5 and 6 are rotated counterclockwise about the shafts 4a, 5a and 6a and make the drive wheel 7 rotate counterclockwise by the engagement of the gears 4, 5 and 6 and the internal gear 7a. The direction of the rotation of the gears is indicated by arrows of solid line in FIG. 1. When the drive wheel 7 is fixed and the drive gear 3 is rotated clockwise, the planetary gears 4, 5 and 6 are rotated counterclockwise and further moved around the drive gear 3 in the clockwise direction as indicated by broken lines. Therefore, the free wheel 8 which carries the shafts 4a, 5a and 6a of the planetary gears 4, 5 and 6 fixed thereon is rotated clockwise.

Thus, the clutch mechanism as described hereinabove has a function to transmit the rotation of a motor selectively to one of two rotatable wheels. In other words, in accordance with the clutch mechanism as described above, it is possible to stop the transmission of rotation of a motor to one rotatable member without stopping the motor and without laying a burden on the motor by switching the transmission of rotation from the member to another member.

FIG. 2 shows a vertical sectional view of the clutch mechanism as described hereinabove referring to FIG. 1. A drive gear 3 fixed to a shaft 2 of a motor 1, planetary gears 4, 5 and 6 meshed with the drive gear 3, a drive wheel 7 having an internal gear 7a meshed with the planetary gears 4, 5 and 6, and a free wheel 8 carrying shafts 4a, 5a and 6a for rotatably supporting the planetary gears 4, 5 and 6 are constructed as described hereinabove with reference to FIG. 1. The drive wheel 7 is integrally connected with an operating member 10 which is supported by an arm 20 at a position concentric with the shaft 2 of the motor 1. The outer periphery of the drive wheel 7 is provided with a plurality of the projections 7b. A friction brush 11 is provided in friction contact with the outer peripheral surface of the drive wheel 7. The free wheel 8 has a cylindrical portion 8b extending along the shaft 2 of the motor for rotatably supporting the same thereabout and has an outer peripheral cylindrical portion 8a extending in parallel to the said cylindrical portion 8b. The outer peripheral cylindrical portion 8a is provided with a plurality of projections 8c similar to said projections 7b provided on the periphery of the drive wheel 7.

A transmission change-over mechanism 21 comprising a rod 26 fixed to a push button 25 and vertically movable being guided by an arm 22 and upwardly spring biased by a spring 27 is provided beside the drive wheel 7 and the free wheel 8. The rod 26 has an upper hook 23 and a lower hook 24, the upper hook 23 being engageable with the projection 7b of the drive wheel 7 and the lower hook being engageable with the projection 8c of the free wheel 8. One of the hooks is selectively put into engagement with the projection 7b or 8c so that one of the wheels may be stopped of its rotation thereby. When the rod 26 is in its upper position as shown in FIG. 2, the lower hook 24 is engaged with the projection 8c of the free wheel 8 to stop the free wheel 8. When the rod 26 is in the lower position being pushed down overcoming the spring force of the spring 27, the upper hook 23 is engaged with the projection 7b of the drive wheel 7 to stop the rotation thereof.

The friction brush 11 prevents the drive wheel 7 from rotating by inertia when the lower hook 24 is disengaged from the projection 8c of the free wheel 8 and the upper hook 23 is moved to the position for engagement with the projection 7b of the drive wheel 7. Further, the friction brush 11 also serves to prevent the drive wheel 7 from start to rotate when the upper hook 23 is disengaged from the projection 7b of the drive wheel 7 and the lower hook 24 is moved to the position for engagement with the projection 8c of the free wheel 8.

Thus, the above described clutch mechanism is controlled so that the drive wheel 7 is rotated when the push button 25 is released, and is stopped when the push button 25 is pushed down.

It should be noted that the present invention is not characterized in that the above described clutch mechanism using a planetary gear mechanism is employed. Therefore, any other type of clutch mechanism different from the above described one may be employed in this invention.

Now an embodiment of the motor driven camera in accordance with the present invention will hereinbelow be described in detail with reference to FIG. 3. In the embodiment shown in FIG. 3, the clutch mechanism as described hereinabove is employed, the various parts of which are designated by the same reference numerals as those employed in FIGS. 1 and 2.

Figure 3:
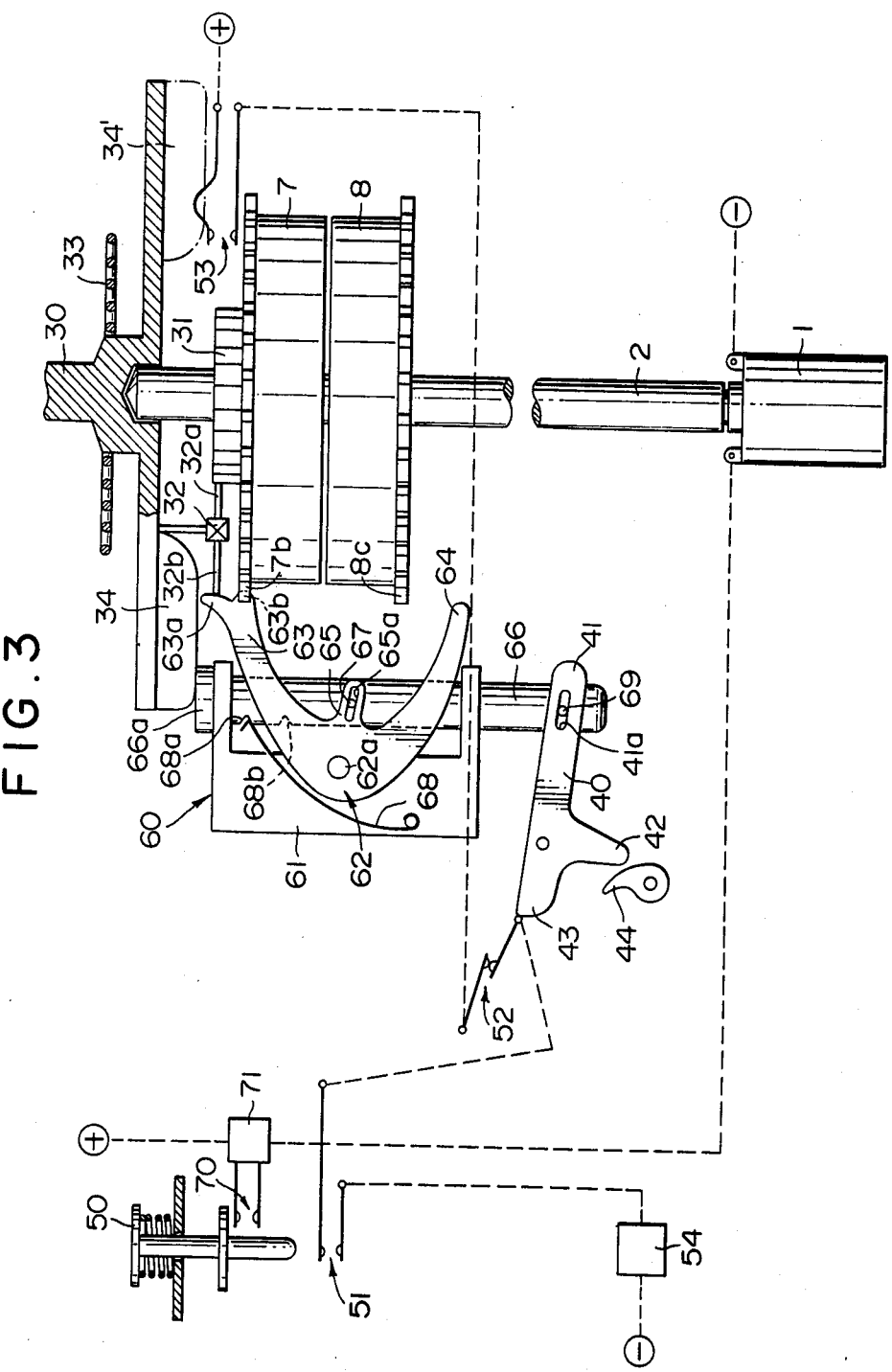
FIG. 3 is a schematic side view showing an embodiment of the motor driven camera in accordance with the present invention.

Referring to FIG. 3, the motor 1 is electrically connected with a power source by way of a main power switch 71 connected with a self-holding circuit 70. The shaft 2 of the motor 1 is connected with a clutch mechanism as described hereinabove with reference to FIG. 2. A film wind-up member 30 (hereinafter referred to simply as "wind-up member") is connected with the drive wheel 7 by way of a ratchet wheel 31 fixed to the drive wheel 7 and a hook member 32 which is fixed to the wind-up member 30 and has a hook 32a to be engaged with the ratchet wheel 31 in response to the movement of a hereinafter described change-over lever 62. The wind-up member 30 is rotatable about the shaft 2 of the motor 1 and spring-biased in the counterclockwise direction by means of a spring 33. When the hook 32a of the hook member 32 is engaged with the ratchet wheel 31, the wind-up member 30 is rotated together with the drive wheel 7. When the hook 32a is disengaged from the ratchet wheel 31, the wind-up member 30 is rotated counterclockwise by the force of the spring 33 up to a start position. The hook member 32 comprises said hook 32a urged to be engaged with the ratchet wheel 31 and a lever 32b which makes the hook 32a disengaged from the ratchet wheel 31 when moved to the right. Therefore, when the lever 32b is released or allowed to move to the left, the hook 32a is engaged with the ratchet wheel 31, and when the lever 32b is moved to the right by an external force, the hook 32a is disengaged from the ratchet wheel 31. When the hook 32a is disengaged from the ratchet wheel 31, it is held in the disengaged position by a click means (not shown) until the wind-up member 30 is returned to its start position. When the wind-up member 30 is returned to its start position by the force of the spring 33, the hook 32a is released to fall into engagement with the ratchet wheel 31.

In this embodiment, a transmission change-over mechanism 60 is employed instead of the transmission change-over mechanism 21 as described in FIG. 2. The transmission change-over mechanism 60 comprises a base portion 61 fixed to a part of the camera body, a change-over lever 62 having a first, second and third arms 63, 64 and 65 rotatably mounted to the base portion 61, and a vertically slidable rod 66 guided by the base portion 61 to slide up and down. The slidable rod 66 has a pin 67 which is engaged with an elongated hole 65a provided in said third arm 65 of the change-over lever 62 so that the change-over lever 62 may be swung back and forth by the vertical slide of the slidable rod 66. When the slide rod 66 is moved down, the change-over lever 62 is rotated clockwise. The slidable rod 66 has two click notches 68a and 68b to be engaged with a click spring 68 one end of which is fixed to the base portion 61, the upper click notch 68a being engaged with the click spring 68 when the slidable rod 66 is in the lower position and the lower click notch 68b being engaged with the click spring 68 when the slidable rod 66 is in the higher position.

The change-over lever 62 stops the drive wheel 7 when it is rotated clockwise and stops the free wheel 8 when it is rotated counterclockwise. The first arm 63 has two extended portions 63a and 63b at the end thereof, one portion 63a serving to push the lever 32b of the hook member 32 and the other portion 63b serving to stop the drive wheel 7 being engaged with the projection 7b of the drive wheel 7. The second arm 64 is engaged with the projection 8c of the free wheel 8 when the change-over lever 62 is rotated counterclockwise. Therefore, when the change-over lever 62 is rotated counterclockwise, the free wheel 8 is stopped and the drive wheel 7 is released to rotate and the hook 32a is engaged with the ratchet wheel 31 to make the wind-up member 30 rotate together with the drive wheel 7. When the change-over lever 62 is rotated clockwise, the free wheel 8 is released to rotate and the drive wheel 7 is stopped and the hook 32a is disengaged from the ratchet wheel 31 so that the wind-up member 30 may be rotated counterclockwise to its start position by the force of the spring 33.

The slidable rod 66 has a pin 69 at a lower portion thereof which is engaged with an elongated hole 41a of a first arm 41 of an interrelating lever 40 pivotally mounted in the camera body. The interrelating lever 40 has three arms 41, 42 and 43. The second arm 42 is pushed to the right by a cam 44 which rotates clockwise when the shutter release is completed. Therefore, when the shutter release is completed, the second arm 42 of the lever 40 is pushed to the right and the first arm 41 is moved upward to slide the slidable rod 66 upward. The slidable rod 66 has a head 66a at the top end thereof which is projected upward out of the base portion 61 when the slidable rod 66 is slid upward. The head 66a is pushed downward by a tapered portion 34 integrally fixed to the wind-up member 30 when the wind-up member 30 is rotated clockwise. Thus, the slidable rod 66 is moved down when the film wind up is completed and moved up when the shutter release is completed.

The third arm 43 of the interrelating lever 40 is provided with a second switch 52 of the shutter release circuit so that the second switch 52 may be opened in response to the counterclockwise rotation of the interrelating lever 40 and closed in response to the clockwise rotation thereof.

The shutter release circuit includes a first switch 51 which is closed upon the second stage of depression of the shutter release button 50, a second switch 52 which is closed upon the clockwise rotation of the interrelating lever 40, a third switch 53 which is closed by the tapered position 34 of the wind-up member 30 while the tapered portion 34 is in the start position indicated by a chain line at 34' and opened upon movement of the tapered portion 34 from said position to the position indicated by a solid line in FIG. 3, and a shutter blade driving circuit 54 which drives or start the shutter blade to expose the film. The three switches 51, 52 and 53 and the shutter blade driving circuit 54 are connected in series with an electric source.

In operation of the hereinabove described embodiment of the present invention, the main switch 70 is closed upon the first stage of depression of the shutter release button 50 and makes the driving motor 1 start to rotate. The main switch 70 has a self-holding circuit 71 which keeps the switch 70 closed until the shutter release is completed and the film wind-up operation is finished so that the switch 70 may not be opened if the shutter release button 50 is released to move upward. At this moment, the first arm 63 is in the position where the end 63b thereof is engaged with the projection 7b of the drive wheel 7 and accordingly the rotation of the motor 1 is transmitted only to the free wheel 8 and the speed of revolution of the motor 1 reaches a predetermined value.

Then, upon the second stage of depression of the shutter release button 50, the first switch 51 is closed. Since the second and third switches are closed at this moment, the shutter blade driving circuit 54 is operated to drive the shutter blades and release the shutter. When the shutter release is completed, the cam 44 is rotated clockwise and the interrelating lever 40 is rotated counterclockwise. Then, the second switch 52 is opened to stop the operation of the shutter blade driving circuit 54 and the slidable rod 66 is moved upward by the engagement of the pin 69 and the elongated hole 41a. By the upward movement of the slidable rod 66, the change-over lever 62 is rotated counterclockwise to separate the end of the first arm 63 from the drive wheel 7 and the lever 32b and to make the end of the second arm 64 engaged with the free wheel 8 to stop the same. The hook 32a is accordingly engaged with the ratchet wheel 31 and the wind-up member 30 is rotated together with the drive wheel 7 clockwise (view from above). The third switch 53 is opened since the tapered portion 34 is moved to the position indicated in FIG. 3 by the rotation of the wind-up member 30. When the wind-up member 30 is rotated clockwise by 180° to the position shown in FIG. 3, the tapered portion 34 thereof pushes the slidable rod 66 downward and makes the change-over lever 62 and the interrelating lever 40 clockwise.

By the clockwise rotation of the change-over lever 62, the second arm 64 is disengaged from the projection 8c of the free wheel 8 and the first arm 63 is engaged with the projection 7b of the drive wheel 7 to stop the drive wheel 7. Further, the end portion 63a of the first arm 63 pushes the lever 32a to the right to disengage the hook 32a from the ratchet wheel 31. Therefore, the wind-up member 30 is released to rotate counter-clockwise to return to its start position indicated by the chain line in FIG. 3 by the force of the spring 33.

By the clockwise rotation of the interrelating lever 40, the cam 44 is rotated counterclockwise and the second switch 52 of the shutter release circuit is closed. Since the third switch 53 is still open until the wind-up member 30 returns to the start position by its 180° rotation, the shutter blade driving circuit 54 is not operated. Therefore, the shutter is not released until the wind-up member 30 is completely returned to its start position to close the third switch 53.

When the wind-up member 30 is completely returned to its start position by the force of the spring 33, the tapered portion 34 closes the third switch 53 and resets the whole mechanism and electric circuit of the motor driven camera in accordance with the present invention.

Accordingly, if the shutter release button 50 is kept being depressed in its second stage of depression, the shutter is automatically repeatedly released to successively expose the subsequent frames of the film. If the shutter release button 50 is returned to its upper position when the wind-up member 30 is completely returned to its start position, the self-holding of the main switch 70 is nullified and the motor 1 is stopped.

I claim:

1. A motor driven camera comprising in combination:
   a power source,
   an electric motor,
   a shutter release button,
   a motor start switch connected between the power source and the electric motor which is closed upon the first stage of depression of the shutter release button,
   a shutter driving circuit provided in the camera for releasing a shutter in the camera,
   a first shutter operating switch connected between the power source and the shutter driving circuit and closed upon the second stage of depression of the shutter release button,
   a film wind-up means for winding up a film in the camera movable between a first position and a second position, said film wind-up means being moved from the first position to the second position when winding up the film,
   a clutch means operatively connected between said motor and said film wind-up means,
   a clutch operating means for making said clutch means transmit the rotation of the motor to said film wind-up means in response to completion of shutter release operation,
   a clutch releasing means for making said clutch means disconnect the film wind-up means from the motor in response to completion of film wind-up operation, and
   a second shutter operating switch connected between the power source and the shutter driving circuit and opened while the film wind-up means is in operation to wind up the film and closed in response to return of the film wind-up means to said first position after the completion of the film wind-up operation,
   whereby the film wind-up operation and the shutter release operation are repeatedly continued while the shutter release button is kept being depressed in the second stage of depression.

2. A motor driven camera as defined in claim 1 wherein said clutch means comprises a drive gear fixed to a shaft of the motor, a drive wheel connected with said film wind-up means by way of a one-way transmission means, a free wheel, said drive wheel and said free wheel being engaged with the drive gear by means of a gear mechanism which acts to transmit the rotation of the motor only to one wheel when the other wheel is stopped.

3. A motor driven camera as defined in claim 2 wherein said free wheel and said drive wheel are movable about the shaft of the motor, and said gear mechanism for engaging the drive wheel and the free wheel with the drive gear comprises a plurality of planetary gears meshed with the drive gear and rotatable about shafts fixed to said free wheel and a single gear fixed to the drive wheel concentrically therewith enclosing the planetary gears and having internal teeth meshed with the planetary gears.

4. A motor driven camera as defined in claim 2 wherein said clutch operating means is a member which is engageable with the free wheel to stop the rotation thereof.

5. A motor driven camera as defined in claim 2 wherein said clutch releasing means is a member which is engageable with the drive wheel to stop the rotation thereof.

6. A motor driven camera as defined in claim 2 wherein a swingable lever having a first arm and a second arm is provided in the camera, said clutch operating means is said first arm of the swingable lever and said clutch releasing means is the second arm of the swingable lever, said swingable lever being movable between a first position wherein said first arm is engaged with the free wheel and said second arm is not engaged with the drive wheel, and a second position wherein said first arm is not engaged with the free wheel and said second arm is engaged with the drive wheel.

7. A motor driven camera as defined in claim 6 wherein said swingable lever is connected with said film wind-up member by way of a movable member so that the swingable lever is moved from the first position to the second position when the film wind-up member is moved from said first position to said second position and vice versa.

* * * * *